(12) United States Patent
Kita et al.

(10) Patent No.: US 6,835,772 B2
(45) Date of Patent: Dec. 28, 2004

(54) LOW-TEMPERATURE CURING, FAVORABLE FEEL COATING COMPOSITION

(75) Inventors: Takashi Kita, Okayam-ken (JP); Hiroyuki Arimoto, Okayama-ken (JP); Osamu Shoji, Okayama-ken (JP); Takayuki Kishimoto, Tsuyama (JP); Kenji Kawazu, Nagoya (JP); Mika Kai, Toyota (JP)

(73) Assignees: Ohashi Chemical Industries Ltd., Okayama-ken (JP); Toyota Jidosha Kabushiki Kaisha, Toyota (JP)

( * ) Notice: Subject to any disclaimer, the term of this patent is extended or adjusted under 35 U.S.C. 154(b) by 432 days.

(21) Appl. No.: 10/055,372

(22) Filed: Jan. 25, 2002

(65) Prior Publication Data

US 2002/0147253 A1 Oct. 10, 2002

(30) Foreign Application Priority Data

Jan. 29, 2001 (JP) .................................. 2001-020104
Nov. 14, 2001 (JP) .................................. 2001-348449

(51) Int. Cl.$^7$ .............................. C08J 3/00; C08K 3/20; C08L 75/00; B32B 27/00; C08G 18/16
(52) U.S. Cl. .................... 524/590; 428/423.1; 523/200; 523/207; 524/589; 524/290; 524/839; 524/840; 528/44; 528/49; 528/74.5
(58) Field of Search ................................ 524/589, 590, 524/591, 839, 840; 523/200, 207; 528/44, 49, 74.5; 428/423.1

(56) References Cited

U.S. PATENT DOCUMENTS

| | | | |
|---|---|---|---|
| 5,021,520 A | | 6/1991 | Reiff et al. .................. 525/458 |
| 5,962,620 A | * | 10/1999 | Reich et al. .................. 528/76 |
| 6,254,937 B1 | | 7/2001 | Schafheutle et al. ...... 427/388.2 |

FOREIGN PATENT DOCUMENTS

| | | |
|---|---|---|
| EP | 0388781 | 3/1990 |
| EP | 0978549 | 7/1999 |

OTHER PUBLICATIONS

Kenji Kawazu et al., U.S.A., SAE Technical Paper Series, 2001–01–1362, Published on 2000.
Kenji Kawazu et al., Japan, Society of Automotive Engineers of Japan, Inc., Processing, No. 87–99, pp. 19–22 (1999).
European Search Report dated May 28, 2002.
Japanese Unexamined Patent Publication No. 1995–292053, Published on Nov. 7, 1995. w/concise statement of relevancy attached.
Fritz Hostettler and Eugene F. Cox; Research Department, Union Carbide Chemicals, Co., South Charleston, W. VA.; Catalyst for Urethane Technology: Organotin Compounds in Isocyanate Reactions.

* cited by examiner

*Primary Examiner*—Patrick Niland
(74) *Attorney, Agent, or Firm*—Armstrong, Kratz, Quintos, Hanson & Brooks, LLP

(57) ABSTRACT

This invention aims to provide a favorable feel coating film having gently soft feel (comfortable feel), a coating composition for forming the coating film, and fine particles of a polymer for incorporation in the coating composition, and concerns with fine particles of lanolin-deposited polyurethane resin obtainable by reacting at least one of polyesters and polyethers with polyisocyanate having at least two isocyanate groups in a poor solvent in the presence of a lanolin derivative; a coating composition comprising (i) at least one binder resin selected from the group consisting of polyester resins and polyether resins, the binder resin having a specific glass transition temperature, a specific number average molecular weight and a specific hydroxyl value, (ii) polyisocyanate having at least two isocyanate groups, (iii) the fine particles of polyurethane resin as described above, and (iv) an organic solvent; and an article coated with the coating composition.

12 Claims, No Drawings

LOW-TEMPERATURE CURING, FAVORABLE FEEL COATING COMPOSITION

BACKGROUND OF THE INVENTION (1) Field of the Invention

The present invention relates to fine particles of polyurethane resin, a coating composition containing the fine particles thereof for forming a favorable feel coating film, and an article coated with the coating composition.

(2) Description of the Related Art

Automotive interior parts such as instrument panels are generally coated with a matte coating composition in order to impart a high class feel or a favorable feel to parts. Further, some interior articles are coated with a matte coating composition.

Conventional matte coating compositions contain matting agents such as inorganic fine particles, e.g. silica, diatomaceous earth, alumina, calcium carbonate or the like, fine particles of acrylic resins or the like. Coating films formed of these coating compositions are hard and less elastic as the coating film, and lack "gently soft feel (comfortable feel)".

A matte coating film containing fine particles of polyurethane resin as a matting agent is elastic but uneven, rough and unsmooth on the surface.

As described above, conventional coating compositions are not satisfactory in gently soft feel (comfortable feel) and remain unsatisfactory in terms of feel.

BRIEF SUMMARY OF THE INVENTION

An object of the invention is to provide a favorable feel coating film having gently soft feel (comfortable feel), and a coating composition for forming such coating film.

It was heretofore considered difficult to quantitatively determine the feel. Recently, however, a concept of "soft value (S value)" for quantitatively determining the feel has been established [Kenji Kawazu et al., Society of Automotive Engineers of Japan, Inc., Proceedings, No.87–99, p.p.19–22 (1999); and Kenji Kawazu et al., SAE Technical Paper Series, 1362 (2000–01)]. The S value is determined based on 4 sensory factors, namely, moist-dry feel, smooth-rough feel, warm-cool feel and soft-hard feel.

We quantitatively determined the feel of coating films containing inorganic fine particles or fine particles of acrylic resin based on the S value. It was found that the surface of the coating film was hardened due to the matting agent and that the coating film lacked the required elasticity of coating film and was markedly insufficient in moist-dry feel and soft-hard feel. On the other hand, coating films containing fine particles of polyurethane resin were found superior in soft-hard feel to coating films containing inorganic fine particles or fine particles of acrylic resin but inferior in moist-dry feel and lacking in "gently soft feel (comfortable feel)".

The present inventors conducted extensive research to improve the "gently soft feel" by increasing the moist-dry feel and soft-hard feel. In the course of the research, the inventors evaluated the feel of coating films formed of coating compositions containing fine particles of polyurethane resin and lanolin. The coating films were superior in gently soft feel but inferior in resistance to beef tallow, adhesion, recoat adhesion, moisture resistance, and wear resistance.

The present inventors carried out further researches and consequently found the following. When fine particles of lanolin-deposited polyurethane resin obtainable by reacting at least one member selected from the group consisting of polyester resins and polyether resins with polyisocyanate having at least two isocyanate groups in a poor solvent in the presence of a lanolin derivative, it is possible to form a favorable feel coating film which is superior in "gently soft feel" and outstanding in resistance to beef tallow, adhesion, recoat adhesion and the like.

Furthermore, the present inventors investigated improvements of such coating composition in the low-temperature curability and pot life. Generally, curable resin compositions contain a reaction accelerator in an amount of about 0.1 wt. % based on the total weight of solids in the coating composition to enhance the curability, and a reaction retarder in a specified amount based on the conventional amount of the reaction accelerator, i.e. in an amount of about 1 wt. % based on the total weight of solids in the coating composition to extend the pot life. Since the coating composition of the invention failed to achieve the low-temperature curability by conventional measures, the inventors tentatively incorporated a reaction accelerator in more than the conventional amount. In this case, a conventional amount of reaction retarder was used, but failed to give longer pot life. In a further course of the investigation, it was considered that the use of a large amount of a reaction retarder would lower the solubility of the polyisocyanate, so that it would be impossible to obtain a coating composition having a prolonged pot life. Surprisingly, however, when the inventors tentatively added a large amount of a reaction accelerator and a large amount of a reaction retarder, it was discovered that two conflicting effects, i.e. superior low-temperature curability and longer pot life, were attained at the same time.

The present invention was accomplished based on these findings.

The invention provides the following.

Item 1. Fine particles of lanolin-deposited polyurethane resin comprising a lanolin derivative and fine particles of polyurethane resin, the lanolin derivative being not removed (being retained) even when the fine particles of lanolin-deposited polyurethane resin are washed with a good solvent for the lanolin derivative.

Item 2. The fine particles of lanolin-deposited polyurethane resin as defined in Item 1 which have an average particle size of 5 to 40 μm.

Item 3. The fine particles of lanolin-deposited polyurethane resin as defined in item 1 which are obtainable by reacting at least one member selected from the group consisting of polyester resins and polyether resins with a polyisocyanate having at least two isocyanate groups in a poor solvent in the presence of the lanolin derivative.

Item 4. The fine particles of lanolin-deposited polyurethane resin as defined in item 3, wherein the amount of deposited lanolin is such that the average particle size is increased by 1 to 5 μm when reacting said at least one member selected from the group consisting of polyester resins and polyether resins with the polyisocyanate having at least two isocyanate groups in a poor solvent in the presence of the lanolin derivative, compared with the average particle size of fine particles obtained by reacting said at least one member selected from the group consisting of polyester resins and polyether resins with the polyisocyanate having at least two isocyanate groups in a poor solvent in the absence of the lanolin derivative.

Item 5. A process for preparing the fine particles of lanolin-deposited polyurethane resin as defined in item 1, the process comprising reacting at least one member selected from the group consisting of polyester resins and polyether resins with a polyisocyanate having at least two isocyanate groups in a poor solvent in the presence of a lanolin derivative.

Item 6. A coating composition comprising:
  (i) at least one binder resin selected from the group consisting of polyester resins and polyether resins, the binder resin having a glass transition temperature of −30 to −70° C., a number average molecular weight of 1,000 to 50,000 and a hydroxyl value of 30 to 70 mgKOH/g resin,
  (ii) a polyisocyanate having at least two isocyanate groups,
  (iii) the fine particles of lanolin-deposited polyurethane resin as defined in item 1, and
  (iv) an organic solvent.

Item 7. The coating composition as defined in item 6 which contains 5 to 20 parts by weight of the fine particles of lanolin-deposited polyurethane resin per 100 parts by weight of the total weight of the binder resin and the polyisocyanate having at least two isocyanate groups.

Item 8. The coating composition as defined in item 6 which further contains (v) a reaction accelerator and (vi) a reaction retarder, wherein the amount of the reaction accelerator is 0.2 to 2% by weight based on the total weight of solids in the composition and the amount of the reaction retarder is 5 to 15% by weight based on the total weight of solids in the composition.

Item 9. The coating composition as defined in item 8, wherein the binder resin has a glass transition temperature of −30 to −70° C., a number average molecular weight of 1,000 to 25,000 and a hydroxyl value of 50 to 70 mgKOH/g resin and is at least one member selected from the group consisting of polyester resins and polyether resins, wherein the fine particles of lanolin-deposited polyurethane resin comprise a lanolin derivative and fine particles of polyurethane resin, in which the lanolin derivative can not be removed but retained even when the fine particles of lanolin-deposited polyurethane resin are washed with a good solvent for the lanolin derivative, wherein the fine particles of the lanolin-deposited polyurethane resin have an average particle size of 5 to 40 μm, and a hydroxyl value of 50 to 200 mgKOH/g resin, and wherein the proportions of the binder resin and the polyisocyanate (by weight ratio) ranges from 80:20 to 40:60.

Item 10. The coating composition as defined in item 8, wherein the ratio (weight ratio) of the reaction accelerator (x) and the reaction retarder (y) is x:y=1:20 to 1:7.5.

Item 11. The coating composition as defined in item 8, wherein the reaction accelerator is a tin catalyst.

Item 12. A coated article prepared by applying the coating composition of item 6 to a substrate to be coated.

Item 13. A coated article having a coating film with an S value of 0.51 to 1.

Item 14. The coated article as defined in item 13, therein the coating film is formed by applying the coating composition as defined in item 6 to a substrate to be coated.

Item 15. The process as defined in item 5, wherein the lanolin derivative is polyoxyalkylene (the number of moles of alkylene oxide added=5 to 75) lanolin alcohol.

Item 16. The process as defined in item 5, wherein the poor solvent is at least one solvent selected from the group consisting of xylene, toluene, mineral spirit, cyclohexane and n-hexane.

Item 17. The process as defined in item 5, wherein the reaction is carried out in the presence of a carbodiimide reagent.

Item 18. The process as defined in item 5, wherein the reaction is carried out in the presence of an oil-modified alkyd resin and a naphthenic acid salt.

Item 19. The coating composition as defined in item 6 which contains the fine particles of lanolin-deposited polyurethane resin in an amount of 5 to 20 parts by weight per 100 parts by weight of the total weight of the binder resin and the polyisocyanate having at least two isocyanate groups, and which also contains an organic solvent in such an amount that the coating composition has a solids content of 20 to 30% by weight.

Item 20. An automotive interior article produced by applying the coating composition of item 6 to a substrate to be coated.

Item 21. The coating composition as defined in item 8, wherein the reaction accelerator is present in an amount of 0.4 to 2% by weight based on the total weight of solids in the composition.

Item 22. The coating composition as defined in item 8, wherein the reaction retarder is present in an amount of 6 to 12% by weight based on the total weight of solids in the composition.

Item 23. The coating composition as defined in item 11, wherein the tin catalyst is at least one member selected from the group consisting of tin octylate, tin naphthenate and dibutyltin dilaurate.

Item 24. The coating composition as defined in item 8, wherein the reaction retarder is at least one member selected from the group consisting of ethyl acetoacetate, butyl acetoacetate and acetylacetone.

Item 25. The coating composition as defined in item 8, wherein the amount of the fine particles of polyurethane resin is 5 to 20 parts by weight per 100 parts by weight of the total weight of the binder resin and the polyisocyanate.

DETAILED DESCRIPTION OF THE INVENTION

The present invention will be described below in more detail.

1. Fine Particles of Polyurethane Resin of the Invention

The fine particles of polyurethane resin according to the invention are composed of a lanolin derivative and fine particles of polyurethane resin, and are in the form of fine particles of lanolin-deposited polyurethane resin from which the lanolin derivative can not be removed even when the lanolin-deposited polyurethane resin is washed with a good solvent (such as xylene and toluene) for the lanolin derivative.

The fine particles of polyurethane resin can be used, e.g., in a coating composition. When the fine particles of polyurethane resin is incorporated in a coating composition, it is desirable that the fine particles have an average particle size of preferably about 5 to about 40 μm, more preferably about 5 to about 35 μm, most preferably about 10 to about 35 μm.

In order to impart excellent low-temperature curability and extended pot life to the coating composition containing the fine particles of polyurethane resin, it is preferred that the lanolin-deposited polyurethane resin fine particles (i) have a hydroxyl value of about 50 to about 200 mgKOH/g resin, especially about 50 to about 150 mgKOH/g resin, and/or (ii) are narrow in the width of particle size distribution such that for example, the fine particles thereof having a particle size of about 20 to about 30 μm are present in a proportion of 90% or more in the measurement of particle size distribution by laser light scattering.

1-1 Properties of Fine Particles of Polyurethane Resin

The lanolin derivative is substantially not removed from the fine particles of polyurethane resin of the invention even when they are washed with a solvent capable of dissolving lanolin or a lanolin derivative and incapable of dissolving a polyurethane resin. In other words, there is substantially no reduction in the weight and particle size of the lanolin-deposited polyurethane resin fine particles before and after being washed with xylene or toluene. Therefore, it is considered that the lanolin is presumably bonded to the surface of polyurethane resin particles due to covalent bond, although the detail of this phenomenon remains to be clarified. The above washing operation is carried out by dispersing the fine particles of lanolin-deposited polyurethane resin of the invention in a good solvent for the lanolin derivative at about 15 to about 40° C. and stirring the dispersion for about 30 to about 60 minutes.

The average particle size of the lanolin-deposited polyurethane resin particles can be measured with a laser diffraction particle size distribution measuring device (LA500, product of Horiba, Ltd.).

The amount of lanolin deposited on the resin is such that the average particle size of polyurethane resin particles is increased by about 1 to about 5 µm, preferably about 1 to about 3 µm, when the particles are produced by reacting at least one member selected from the group consisting of polyester resins and polyether resins with a polyisocyanate having at least two isocyanate groups in a poor solvent in the presence of a lanolin derivative, compared with the average particle size of particles produced by reacting the said at least one member selected from the group consisting of polyester resins and polyether resins with the said polyisocyanate having at least two isocyanate groups in the poor solvent in the same manner except that the lanolin derivative is not used.

That is to say, when the lanolin-deposited polyurethane resin particles are produced by reacting at least one member selected from the group consisting of polyester resins and polyether resins with a polyisocyanate having at least two isocyanate groups in a poor solvent in the presence of a lanolin derivative, the amount of deposited lanolin is such that the average particle size of the lanolin-deposited polyurethane resin particles is about 1 to about 5 µm larger, and preferably about 1 to about 3 µm larger, than the average particle size of polyurethane resin particles produced by reacting them in the same manner except that the lanolin derivative is not used.

1-2 Producing Process

The fine particles of lanolin-deposited polyurethane resin can be prepared, e.g., by reacting at least one member selected from the group consisting of polyester resins and polyether resins with a polyisocyanate having at least two isocyanate groups in a poor solvent in the presence of a lanolin derivative.

1-2-1 Lanolin Derivative

Lanolin which is a raw material for the lanolin derivative is wool fat, i.e. a kind of animal wax, produced as a by-product in collecting wool from sheep's virgin wool. Its chemical composition is not always invariable depending on the kind of sheep, breeding place of sheep, weather conditions and the like. The alcohol components of lanolin predominantly comprise aliphatic alcohols, cholesterols and triterpene alcohols, and the acid components predominantly comprise normal fatty acids, iso fatty acids, anti-iso fatty acids and hydroxy fatty acids. As stated above, the lanolin is a mixture of various compounds so that it takes the form of paste at room temperature, and melts at a temperature of several scores of degrees when heated, but is inherently insoluble in water.

Such lanolin can be made into various derivatives by refining or chemical modification. For example, lanolin is hydrolyzed to give alcohol components and acid components which are then subjected to fractional refining by solvent fractionation, and such refined product is one of the examples of lanolin derivatives. The hydrolyzate or lanolin itself can also be made into lanolin derivatives by acetylation, alkoxylation, sulfonation, hydrogenation, ester exchange, reduction or like chemical actions.

Any of these lanolin derivatives can be used in the invention. Examples of the lanolin derivatives include those prepared by adding ethylene oxide, propylene oxide or like alkylene oxides (=polyoxyalkylene lanolin alcohol; those wherein the number of moles of ethylene oxide or propylene oxide added is about 5 to about 75, preferably about 10 to about 30, are preferred), those prepared by introducing sulfuric acid group, phosphoric acid group or like hydrophilic group therein and salts thereof, alkali metal salts or ammonium salts of lanolin fatty acids.

Useful lanolin derivatives may be commercially available products, such as Bellpol A-20, Bellpol L-30, Bellpol L-50 and Bellpol L-75 (all of them being trade names for the products of Nippon Fine Chemical Co., Ltd.).

The amount of the lanolin derivative to be used is about 5 to about 50 parts by weight, preferably about 10 to about 30 parts by weight, per 100 parts by weight of said at least one member selected from polyester resins and polyether resins used in preparing fine particles of lanolin-deposited polyurethane resin.

1-2-2 Polyester Resin

Useful polyester resins can be prepared by esterification reaction of a polybasic acid and a polyhydric alcohol according to conventional methods.

The polybasic acid is a compound having at least 2 carboxyl groups, preferably 2 to 4 carboxyl groups, in one molecule. Specific examples are succinic acid, glutaric acid, adipic acid, azelaic acid, sebacic acid, dodecanedicarboxylic acid, suberic acid, pimelic acid, maleic acid, fumaric acid, itaconic acid, citraconic acid and like aliphatic polybasic acids; phthalic acid, isophthalic acid, terephthalic acid, biphenyldicarboxylic acid, naphthalenedicarboxylic acid, tetrachlorophthalic acid, trimellitic acid, pyromellitic acid and like aromatic polybasic acid; hexahydrophthalic acid, hexahydroisophthalic acid, hexahydroterephthalic acid, hexahydrotrimellitic acid, methylhexahydroisophthalic acid, tetrahydrophthalic acid, tetrahydroisophthalic acid and like alicyclic polybasic acids; etc. Anhydrides of these polybasic acids can be used in the invention. Among them, terephthalic acid, adipic acid, maleic acid, maleic anhydride and phthalic anhydride are more preferable.

The polyhydric alcohol is a compound having at least two hydroxyl groups, especially 2 to 4 hydroxyl groups, in one molecule. Examples are ethylene glycol, propylene glycol, diethylene glycol, trimethylene glycol, dipropylene glycol, butanediol, pentanediol, cyclohexane diol, neopentyl glycol, adduct of lactone with polyol, glycerin, trimethylol propane, trimethylol ethane, pentole, hydrogenated bisphenol A and like aliphatic or alicyclic polyhydric alcohols. Among them, ethylene glycol, glycerin and pentole are more preferred.

Polyester resins which are used in preparing fine particles of polyurethane resin according to the invention can be prepared by esterification reaction of the polybasic acid and polyhydric alcohol exemplified above by conventional methods.

The molecular weight of the polyester resin is not specifically limited, but is usually about 4,000 to about 40,000, preferably about 15,000 to about 30,000 in terms of a number average molecular weight.

The polyester resins which are used in preparing the fine particles of lanolin-deposited polyurethane resin according to the invention have a hydroxyl value of preferably about 20 to about 80 mgKOH/g resin, more preferably about 40 to about 70 mgKOH/g resin, although not limited thereto.

1-2-3 Polyether Resin

Useful polyether resins are polyethylene glycol, polypropylene glycol, polyethylene-propylene glycol and so on.

The polyether resin to be used in preparing the fine particles of lanolin-deposited polyurethane resin according to the invention can be produced from ethylene oxide, propylene oxide or the like through polymerization by conventional methods. The molecular weight of the polyether resin is not specifically limited but is usually about 4,000 to about 40,000, preferably about 15,000 to about 30,000, in terms of number average molecular weight.

The hydroxyl value of polyether resin to be used in preparing the fine particles of lanolin-deposited polyurethane resin according to the invention is not specifically limited but preferably about 20 to about 80 mgKOH/g resin, more preferably about 40 to about 70 mgKOH/g resin.

1-2-4 Polyisocyanate Having at Least two Isocyanate Groups

The polyisocyanate having at least two isocyanate groups is a compound having at least 2 free isocyanate groups, especially 2 to 4 free isocyanate groups, in one molecule. Specific examples are organic polyisocyanates such as hexamethylene diisocyanate, trimethylhexamethylene diisocyanate and like aliphatic diisocyanates; isophorone diisocyanate and like alicyclic diisocyanates; tolylene diisocyanate, 4,4'-diphenylmethane diisocyanate, xylylene diisocyanate, naphthylene diisocyanate and like aromatic diisocyanates; triphenylmethane-4,4',4"-triisocyanate, 1,3,5-triisocyanato benzene, 2,4,6-triisocynato toluene, 4,4'-dimethyldiphenyl methane-2,2',5,5'-tetraisocyanate and like polyisocyanates having at least 3 isocyanate groups.

The polyisocyanate having at least 2 isocyanate groups may have isocyanate groups blocked with a blocking agent. Useful blocking agents can be any of the following type: phenol, lactam, active methylene, alcohol, mercaptan, acid amide, imide, amine, imidazole, urea, carbamic acid ester, imine, oxime, sulfite and the like. It is preferred to use blocking agents of the following type: phenol, lactam, alcohol, oxime and the like.

The polyisocyanate having at least 2 isocyanate groups may be commercially available products such as Burnock D-750, Burnock-800, Burnock DN-950, Burnock DN-970, Burnock DN-15-455 (all of them being trade names for the products of Dainippon Ink and Chemicals, Inc.), Desmodur L, Desmodur N, Desmodur HL, Desmodur N3390 (all of them being trade names for the products of Sumitomo Byer Urethane Co., Ltd.), Takenate D-102, Takenate-202, Takenate-110, Takenate-123N (all of them being trade names for the products of Takeda Chemical Ind., Ltd.), Coronate EH, Coronate L, Coronate HL, Coronate 203 (all of then being trade names for the products of Nippon Polyurethane Industry Co., Ltd.), Duranate E-402-90T, Duranate 2A-90CX (both of them being trade names for the products of Asahi Kasei Co.) and the like.

The amount of the polyisocyanate having at least 2 isocyanate groups to be used relative to said at least one member selected from the group consisting of polyester resins and polyether resins ranges from M to 1.3M, preferably from 1.1M to 1.2M, wherein M is an amount of polyisocyanate in which the quantity of the isocyante groups is stoichiometrically equivalent to the quantity of hydroxyl groups of the resin.

1-2-5 Poor Solvent

The term "poor solvent" used herein refers to a solvent which is incapable of dissolving the obtained fine particles of polyurethane resin and which is low in capability of dissolving said at least one member selected from the group consisting of polyester resins and polyether resins, the solvent being unreactive with the polyisocyanate having at least 2 isocyanate groups. Examples of such poor solvent are xylene, toluene and like aromatic hydrocarbons; cyclohexane, ethylcyclohexane and like alicyclic hydrocarbons; n-hexane and like alicyclic saturated hydrocarbons; mineral spirit; etc.

The amount of the poor solvent to be used is about 500 to about 1,000 parts by weight, preferably about 600 to about 800 parts by weight, per 100 parts by weight of at least one member selected from the group consisting of polyester resins and polyether resins.

1-2-6 Adhesive Reagent (Carbodiimide)

An adhesive reagent may be used in producing the fine particles of polyurethane resin. The adhesive reagent, is used to act as a medium in the reaction between the polyisocyanate having at least two isocyanate groups and the lanolin derivative for effecting a reaction with carboxylic acid group, hydroxyl group and amino group, or is used to narrow the intermolecular distance between the polyisocyanate having at least two isocyanate groups and the lanolin derivative due to the presence thereof in the reaction system. Preferable examples of the adhesive reagents include, for example, N,N-dicyclohexyl-carbodiimide, 1-cyclohexyl-3(2-morpholinoethyl)-carbodiimide and like carbodiimide reagents, among which N,N-dicyclohexylcarbodiimide is more preferable.

The adhesive regent, if employed, is used in an amount of about 5 to about 30 parts by weight, preferably about 8 to about 15 parts by weight, per 100 parts by weight of at least one member selected from the group consisting of polyester resins and polyether resins.

1-2-7 Dispersing Agent

The reaction system may contain a dispersing agent. Useful dispersing agents are, for example, oil-modified alkyd resins, naphthenic acid salts, polycarboxylic acids, high-molecular-weight unsaturated esters, silicones and the like.

Examples of usable oil-modified alkyd resins are coconut oil-modified alkyd resins, castor oil-modified alkyd resins, rice bran oil-modified alkyd resins, tall oil-modified alkyd resins, linseed oil-modified alkyd resins, soybean oil-modified alkyd resins, etc.

The oil-modified alkyd resin can be prepared by polymerizing a polyhydric alcohol component such as ethylene glycol, neopentyl glycol, propylene glycol, trimethylolpropane, hexanediol, glycerin, pentaerythritol, butane diol or the like, and an acid component such as isophthalic acid, terephthalic acid, adipic acid, sebacic acid, succinic acid, maleic acid or anhydrides thereof according to conventional methods, and modifying the polymer with coconut oil, castor oil or the like.

The oil-modified alkyd resin to be used in the invention preferably has an oil length of 10 to 50%, more preferably 20 to 45%. The term "oil length" used herein means a weight ratio (%) of oil present in the oil-modified alkyd resin. The oil-modified alkyd resin to be used in the invention preferably has a hydroxyl value of preferably about 50 to about 160 mgKOH/g resin, more preferably about 70 to about 130 mgKOH/g resin, and an acid value of preferably about 15 mgKOH/g resin or less, more preferably about 9 mgKOH/g resin or less.

Preferred examples of the salt of naphthenic acid are zinc naphthenate, iron naphthenate and so on.

The above-described dispersing agents can be used either alone or in combination.

When the dispersing agent is used, the amount thereof is about 5 to about 30 parts by weight, preferably about 10 to about 20 parts by weight, per 100 parts by weight of at least one member selected from the group consisting of polyester resins and polyether resins.

When at least two kinds of the dispersing agent are used, a combination of oil-modified alkyd resin (especially coconut oil-modified alkyd resin) and a salt of naphthenic acid is preferred, and a combination of oil-modified alkyd resin (especially coconut oil-modified alkyd resin) and zinc naphthenate is more preferred. The weight ratio of oil-modified alkyd resin (or coconut oil-modified alkyd resin):a salt of naphthenic acid (or zinc naphthenate) is preferably approximately 100:1 to 100:20, more preferably approximately 100:3 to 100:10.

1-2-8 Reaction Catalyst

A catalyst may be used in the reaction between at least one member selected from the group consisting of polyester resins and polyether resins with polyisocyanate having at least two isocyanate groups in the presence of a lanolin derivative. Examples of the catalyst to be used in the invention include at least one of catalysts which are usually used for urethane reactions such as trimethylenebis(4-aminobenzoate), dimethylethanolamine, triethyleneamine, tetramethylpolymethylenediamine, tris(dimethylaminomethyl)phenol and like arnines, tin octylate, tin naphthenate, cobalt naphthenate, zinc naphthenate, dibutyltin dilaurate and like metal salts, higher carboxylic acid bismuth and the like. These catalysts can be used either alone or in combination.

The amount of the catalyst to be used can be suitably determined according to the amounts and kinds of other. raw materials. It is about 0.01 to about 5 parts by weight, preferably about 0.03 to about 3 parts by weight, more preferably about 0.07 to about 2 parts by weight, per 100 parts by weight of at least one member selected from the group consisting of polyester resins and polyether resins. In order to impart excellent low-temperature curability and long pot life to the fine particles-containing coating composition, the amount of the catalyst to be used is about 0.02 to about 5 parts by weight, preferably about 0.07 to about 2 parts by weight, more preferably about 1 to about 2 parts by weight, per 100 parts by weight of at least one memher selected from the group consisting of polyester resins and polyether resins.

1-2-9 Reaction Conditions

In the producing process of the invention, for example, a lanolin derivative, at least one member selected from the group consisting of polyester resins and polyether resins, polyisocyanate having at least 2 isocyanate groups and optionally an adhesive reagent are added to a poor solvent. Then the mixture was continuously reacted at about 70 to about 100° C., preferably about 60 to about 95° C. for about 0.5 to about 3 hours, preferably about 1 to about 1.5 hours with stirring.

To give excellent low-temperature curability and a long pot life to the fine particles-containing coating composition, the reaction temperature is preferably about 90 to about 95° C.

The dispersing agent and/or the catalyst, if used, may be added after a lanolin derivative and polyester or polyether resin are added to the poor solvent and fully dispersed.

To stop the reaction, a reaction stopper such as propylene glycol monomethyl ether, propylene glycol butyl ether or the like is added to the reaction system. The amount of the reaction stopper to be used is about 10 to about 50 parts by weight, preferably about 20 to about 40 parts by weight, per 100 parts by weight of at least one member selected from polyester resins and polyether resins.

The reaction mixture containing the thus-obtained fine particles of lanolin-deposited polyurethane resin may be used, as it is, in preparing the favorable feel coating composition of the invention. Optionally the reaction mixture containing thus-obtained fine particles of lanolin-deposited polyurethane resin are diluted, for example, with the above-exemplified poor solvent (such as xylene, toluene and like aromatic hydrocarbons; cyclohexane, ethyl cyclohexane and like alicyclic hydrocarbons; mineral spirit; n-hexane and like aliphatic saturated hydrocarbons) by conventional methods, are filtered through metal gauze of about 325 mesh to isolate the particles and then are dried, giving fine particles of lanolin-deposited polyurethane resin.

2. Favorable Feel Coating Composition

The coating composition of the invention for forming a favorable feel coating film comprises:

(i) at least one binder resin selected from the group consisting of polyester resins and polyether resins, the binder resin having a glass transition temperature of −30 to −70° C., a number average molecular weight of 1,000 to 50,000 and a hydroxyl value of 30 to 70 mgKOH/g resin;

(ii) polyisocyanate having at least 2 isocyanate groups;

(iii) the fine particles of lanolin-deposited polyurethane resin of the invention as described above in Item 1 "Fine particles of polyurethane resin of the invention"; and (iv) an organic solvent.

2-1 Binder Resin

The binder resin under (i) in the coating composition of the invention is at least one resin selected from the group consisting of polyester resins and polyether resins. The binder resin has a glass transition temperature of −30 to −70° C., a number average molecular weight of 1,000 to 50,000 and a hydroxyl value of 30 to 70 mgKOH/g resin.

The binder resin in the coating composition of the invention has a glass transition temperature of −30 to −70° C., preferably −30 to −60° C., more preferably about −30 to about −50° C.

The molecular weight of the binder resin is about 1,000 to about 50,000, preferably about 1,000 to about 35,000, more preferably about 3,000 to about 30,000, in terms of a number average molecular weight. To impart excellent low-temperature curability and a long pot life to the coating composition of the invention, the number average molecular weight of the binder resin is preferably about 1,000 to about 25,000, more preferably about 5,000 to about 20,000, most preferably about 10,000 to about 18,000.

When the molecular weight of the binder resin is in the foregoing range, change is unlikely to occur with time. Hence the above range is preferred. Consequently it is suitable for, e.g. automotive interior articles, especially for coating the instrument panels.

The hydroxyl value of the binder resin is about 30 to about 70 mgKOH/g resin, preferably about 40 to about mgKOH/g resin, more preferably about 45 to about 70 mgKOH/g resin. To impart excellent low-temperature curability and long pot life to the coating composition of the invention, the hydroxyl value of the binder resin is preferably about 50 to about 70 mgKOH/g resin, more preferably about 55 to about 68 mgKOH/g resin, most preferably about 58 to about 65 mgKOH/g resin.

Such polyester resin can be prepared by esterification reaction of polybasic acid and polyhydric alcohol as exemplified above in Item 1-2-2 "Polyester resin" by conventional methods.

The polyester resin used as the binder resin has preferably a straight chain structure.

Examples of such polyether resin are polyethylene glycol, polypropylene glycol, polyethylene-propylene glycol, etc. The resin can be prepared from ethylene oxide or propylene oxide through polymerization by conventional methods in a manner to satisfy the above-mentioned requirements for the binder resin.

The amount of the binder resin to be incorporated in the coating composition is about 20 to about 80% by weight, preferably about 30 to about 70% by weight, calculated as the resin solid content.

2-2 Polyisocyanate Having at Least 2 Isocyanate Groups

The polyisocyanate having at least 2 isocyanate groups under (ii) is used as a curing agent in the coating composition of the invention.

The polyisocyanate having at least 2 isocyanate groups to be used is exemplified in Item 1-2-4 "Polyisocyanate having at least two isocyanate groups". Any of polyisocyanates having at least 2 isocyanate groups can be used.

The amount of the curing agent to be used is such that the weight ratio of the binder resin solids to the curing agent in the coating composition, namely binder resin:polyisocyanate ranges from approximately 77:23 to 45.5:54.5, preferably approximately 70:30 to 46.5:53.5.

In order to give excellent low-temperature curability and a long pot life to the coating composition, the curing agent is used in an amount such that the weight ratio of the binder resin solids to the curing agent in the coating composition, namely binder resin:polyisocyanate ranges from preferably approximately 80:20 to 40:60, more preferably approximately 75:25 to 50:50.

2-3 Fine Particles of Lanolin-deposited Polyurethane Resin

The fine particles of polyurethane resin of the invention described in Item 1 "Fine particles of polyurethane resin of the invention" are used as the fine particles of lanolin-deposited polyurethane resin under (iii).

The amount of the fine particles of lanolin-deposited polyurethane resin to be used in the coating composition is such that the amount of the fine particles of polyurethane resin is about 5 to about 20 parts by weight, preferably about 5 to about 15 parts by weight, per 100 parts by weight of the combined weight of the binder resin and the polyisocyanate having at least two isocyanate groups.

2-4 Reaction Accelerator and Reaction Retarder

The coating composition of the invention may contain a reaction accelerator and a reaction retarder at a specified ratio.

The reaction accelerator which can be incorporated into the coating composition of the invention includes conventional reaction accelerators which are used for accelerating the urethane reaction in the field of coating compositions. Preferred examples of such reaction accelerator are tin octylate, tin naphthenate, dibutyltin dilaurate and like tin reaction accelerators. These reaction accelerators can be used either alone or in combination.

Conventionally, such reaction accelerators have been used in an amount of about 0.1% by weight based on the total weight of solids in the composition. However, in the present invention, the reaction accelerator to be used in the coating composition of the invention is used in an amount of about 0.2 to about 2% by weight, preferably about 0.4 to about 2% by weight, more preferably about 0.5 to about 1.5% by weight, based on the total weight of solids in the composition.

The reaction retarder which can be incorporated into the coating composition of the invention includes conventional reaction retarders which are used in the urethane reaction in the field of coating compositions. Examples of such reaction retarder are ethyl acetoacetate, butyl acetoacetate and like C1–C4 lower alkyl acetoacetate, and acetylacetone, etc.

Conventionally, such reaction retarders have been used in an amount of about 2% by weight based on the total weight of solids in the composition. However, when the reaction accelerator is incorporated in the coating composition of the present invention, the reaction retarder is used in an amount of about 5 to about 15% by weight, preferably about 6 to about 12% by weight, more preferably about 6 to about 10% by weight, based on the total weight of solids in the composition.

The ratio of the reaction accelerator (x) to the reaction retarder (y) in terms of weight ratio is (x):(y)=approximately 1:20 to 1:7.5, preferably approximately 1:15 to 1:8, more preferably approximately 1:12 to 1:10.

The coating composition which is excellent in low-temperature curability generally exhibits a short pot life. However, the coating composition of the invention can achieve two conflicting effects at the same time, or more specifically can attain excellent low-temperature curability and long pot life at the same time due to the presence of the reaction accelerator and the reaction retarder in the above-specified amounts.

2-5 Preparation of the Coating Composition

The coating composition of the invention may contain components conventionally used in the coating compositions insofar as the intended effects of the invention can be produced. For example, the coating composition of the invention may optionally contain silica, diatomaceous earth, alumina, calcium carbonate, and like inorganic fine particles, acrylic resin fine particles or the like heretofore used as a matting agent.

The coating composition of the invention can be adjusted to an optimum viscosity for coating with an organic solvent by conventional methods using the fine particles of polyurethane resin of the invention, the binder resin, the polyisocyanate having at least 2 isocyanate groups, and optionally other components such as the reaction accelerator and the reaction retarder. For example, it is preferred to adjust the composition to a solids content of about 20 to about 30% by weight, and to a viscosity of about 12 to about 14 seconds as determined (20° C.) by FC (Ford Cup) No.4. Useful organic solvents include those used as the poor solvent described above in Item 1-2-5 "Poor solvent" (e.g. n-heptane, n-hexane, cyclohexane, benzene, toluene, xylene, etc.). Furthermore, organic solvents other than poor solvents can also be used. When the poor solvent is used as the organic solvent for preparing a coating composition, its use is convenient since the reaction mixture (suspension) containing the fine particles of lanolin-deposited polyurethane resin prepared in the manner set forth in Item 1-2 "Producing process" can be used as such.

When specific amounts of the reaction accelerator and the reaction retarder are incorporated into the coating composition of the invention, the composition is imparted such excellent low-temperature curability that the composition is curable by heating at 70° C. for about 5 minutes, namely it is comparable to lacquer in the film-forming ability. Further, the composition has long pot life, e.g. 2 to 4 hours at 0 to 35°

C. As set forth above, the coating composition of the invention containing specified amounts of the reaction accelerator and the reaction retarder can produce two conflicting effects at the same time, namely can show excellent low-temperature curability and a long pot life. The coating composition of the invention is desirable in terms of energy and line costs for forming coating films and is notably suitable for commercial use.

Preferably the coating composition of the invention containing specified amounts of the reaction accelerator and the reaction retarder shows a pot life of 2 hours or longer. The term "pot life" used herein means a time period required for, for example, an increase in viscosity after preparation of coating composition is 2 seconds as determined by Ford cup (Ford cup No.4 at 20° C.). If an increase in viscosity is not in excess of 2 seconds as determined by Ford cup, it, e.g., eliminates a need for dilution with a solvent. Namely the composition is outstanding in workability. The coating composition of the invention is preferably, e.g. about 12 to about 14 seconds in the viscosity (Ford cup) immediately after the preparation of the composition. Even after the viscosity of the coating composition of the invention has exceeded 2 seconds (Ford cup) after the preparation of coating composition, the composition, if not gelled yet, can be used by dilution to the extent of being coated.

3. Articles of the Invention

The invention includes articles (products) having a coating with an S value of 0.51 to 1 [as determined according to the method described in Society of Automotive Engineers of Japan, Inc., Proceedings, No.87–99, p.p.19–22 (1999)], particularly a coating produced by applying the coating composition of the invention stated above in Item 2 "Favorable feel coating composition" to the surface of a substrate to be coated.

The coating composition of the invention can be applied by conventional methods such as air spray methods, airless spray methods, flow coater methods or the like. The above-mentioned coating composition is sufficiently cured at a temperature ranging from room temperature to about 100° C., preferably about 75 to about 90° C. to form a favorable feel coating film. When the coating composition of the invention contains the reaction accelerator and the reaction retarder, the coating composition is sufficiently cured at a temperature ranging from room temperature to about 90° C., preferably about 65 to about 75° C. to form a favorable feel coating film. The amount of the coating composition to be applied for forming a favorable feel coating film is suitably determined depending on the intended use of finishing products.

It is desirable to apply the composition in an amount which forms a coating film with a thickness of about 10 to about 70 $\mu$m (after curing), preferably about 25 to about 45 $\mu$m (after curing). The curing time is a period of time for which the coating film is cured to the desired extent according to the specified temperature. The coating composition of the invention which contains the reaction accelerator and the reaction retarder is excellent in low-temperature curability so that the composition is cured, for example, in about 5 minutes at about 70° C.

The substrates to be coated with a favorable feel coating film include, for example, plastic materials which are optionally surface-treated, under-coated and intermediate-coated and which are usually used for automotive interior articles (such as instrument panels, door trims, console panels, center clusters, switch panels, meter hoods and shift knobs) and for interior materials for architecture (wall materials, handrails, door knobs, top plates of desks and like internally decorating materials), and composite materials comprising a combination thereof and so on.

Examples of the plastic materials are not particularly limited and selected from a wide range, and typically include acrylonitrile-styrene-butadiene copolymers, polypropylene-based resins, thermoplastic polyolefins.

The articles (products) coated with the coating composition of the invention provide the coating film with sufficient smooth-rough feel and warm-cool feel. The coating film is excellent in moist-dry feel and soft-hard feel, and is a favorable feel coating film having sufficient gently soft feel, e.g., having an S value of 0.51 to 1. The above-mentioned coating composition contains the specific fine particles of polyurethane resin of the invention so that the coating film formed of them is excellent in adhesion, recoat adhesion and resistance to contamination with fats and oils. Such articles. are suitable for use as automotive instrument panels and like automotive interior articles for architecture, interior materials and like interior articles.

EXAMPLES

This invention will be described below in more detail with reference to the following examples, comparative examples and reference examples.

Example 1

Preparation of Fine Particles of Lanolin-deposited Polyurethane Resin

A 60 g quantity of polyester polyol [Desmon No. 2200 (trade name), product of Nippon Polyurethane Industry Co., Ltd.] and 10 g of a lanolin derivative [polyoxyethylene (20) lanolin alcohol, Bellpol A-20 (trade name), product of Nissei Sangyo Co., Ltd.] were poured into xylene (poor solvent, 445 g) together with 7.0 g of N,N-dicyclohexylcarbodiimide (cyanamide) (adhesive reagent). Then 9.0 g of coconut oil-modified alkyd resin (oil length 33) and 0.56 g of zinc naphthenate (both being dispersing agents) were added. The mixture was heated to 85° C. with stirring.

Thereafter 32.5 g of hexamethylene diisocyanate [Coronate HL (trade name), product of Nippon Polyurethane Industry Co., Ltd.] and 50 mg of dibutyltin dilaurate (reaction catalyst) were added. Then, the mixture was subjected to suspension polymerization under non-homogeneous conditions at 85° C. for 1 hour.

After a lapse of 1 hour, 20 g of propylene glycol monomethyl ether was added as a reaction stopper. The mixture was stirred for about 10 minutes, thereby giving 650 g of a suspension containing 260 g of fine particles of lanolin-deposited polyurethane resin wherein the lanolin was deposited to a thickness of about 3 $\mu$m on the surface of fine spheric particles of polyurethane resin of an average particle size of 30 $\mu$m.

The average particle size of the lanolin-deposited polyurethane resin particles were measured with a laser diffraction particle size distribution measuring device (LA500, product of Horiba, Ltd.).

After filtering the suspension, dried fine particles of lanolin-deposited polyurethane resin were washed with xylene and toluene, but the lanolin derivative was not removed from the particles.

Reference Example 1

A suspension (solid concentration 40%) containing 260 g of fine particles of polyurethane resin was prepared in the same manner as in Example 1 with the exception of not using lanolin.

Examples 2 to 7

I-i) Preparation of Coating Composition

Each coating composition was prepared from components a) to e) given below.

a) Binder Resin

Straight-chain polyester resin having a glass transition temperature of −40° C., a number average molecular weight of 3,000 and a hydroxyl value of 40 mgKOH/g resin.

b) Polyisocyanate Containing at Least 2 Isocyanate Groups (Curing Agent)

Polymer of hexamethylene diisocyanate [Duranate E-402-90-T (trade name), product of Asahi Kasei Co., Ltd.].

c) Fine Particles of Lanolin-deposited Polyurethane Resin Prepared in Example 1 (the Lanolin-deposited Polyurethane Resin Fine Particles in the Form of a Suspension Were Used as Such.)

d) Organic Solvent

Xylene e) Fine Particles of Silica (The fine particles of silica are generally used as a matting agent for a coating composition. They were used in such an amount as to make up for the matte remaining insufficient even after adding the fine particles of lanolin-deposited polyurethane resin of the invention and as to render the coating films uniform in gloss.)

The coating compositions of Examples 2 to 7 were prepared by mixing 40 parts by weight of xylene with the binder resin and the matting agent in the amounts indicated in the formulation shown in Table 1 with stirring and dispersing the mixture in the suspension obtained in Example 1 to provide a coating composition having a solid content of 25%. The curing agent was added to the composition i mediately before application of the coating composition.

Comparative Example 1

The coating composition having the formulation shown in Table 1 (solids content 26% by weight) was prepared in the same manner as in Examples 5 with the exception of using the suspension obtained in Reference Example 1 in place of the suspension obtained in Example 1.

Comparative Example 2

The coating composition having the formulation shown in Table 1 (solids content 25% by weight) was prepared in the same manner as in Comparative Example 1 with the exception of further adding Bellpol A-20 (polyoxyethylene (20) lanolin alcohol, trade name, product of Nissei Sangyo Co., Ltd.) to 40 parts by weight of xylene.

Comparative Example 3

The coating composition having the formulation shown in Table 1 (solids content 25% by weight) was prepared in the same manner as in Examples 5 with the exception of adding Bellpol A-20 (polyoxyethylene (20) lanolin alcohol, trade name, product of Nissei Sangyo Co., Ltd.) to 40 parts by weight of xylene and using xylene in place of the suspension obtained in Example 1.

TABLE 1

| | a) Polyester resin | b) Polyisocyanate | c) Lanolin-deposited polyurethane particles of Ex.1 | c') Polyurethane particles of Ref. Ex.1 | c") Lanolin derivative | e) Silica fine particles |
|---|---|---|---|---|---|---|
| Example 2 | 70 | 30 | 5 | — | — | 17 |
| Example 3 | 68 | 32 | 6 | — | — | 16 |
| Example 4 | 65 | 35 | 8 | — | — | 15 |
| Example 5 | 60 | 40 | 12 | — | — | 14 |
| Example 6 | 53 | 47 | 16 | — | — | 12 |
| Example 7 | 47 | 53 | 20 | — | — | 10 |
| Comp.Ex.1 | 60 | 40 | — | 12 | — | 14 |
| Comp.Ex.2 | 60 | 40 | — | 12 | 0.5 | 14 |
| Comp.Ex.3 | 60 | 40 | — | — | 0.5 | 14 |

\* The numerical values in Table 1 show the amounts expressed in part(s) by weight calculated as solids.

I-ii) Preparation for Test Piece

A test piece was produced by applying the coating compositions of Examples 2 to 7 and Comparative Examples 1 to 3 to a substrate of acrylonitrile-styrene-butadiene copolymer to form a coating film having a thickness of about 30 to about 40 μm (after drying) and drying the coated substrate for 30 minutes at 80° C.

I-iii) Property Evaluation of Coating Film (Adhesion)

The test piece produced in I-ii) was left to stand at room temperature for 48 hours and was subjected to a cross-cut adhesion test to evaluate the adhesion of coating film. Further the test piece was left to stand in a humidistat box (50° C., 95% RH or higher) for 240 hours and was subjected to a cross-cut adhesion test to evaluate the adhesion of coating film. Specifically, 100 squares (2 mm×2 mm) were formed on the surface of each coating film, and an adhesive tape was adhered to the surface and the peeled off. The results are shown in Table 2.

TABLE 2

| | After 48 hours | After 240 hours (in humidistat) |
|---|---|---|
| Example 2 | A | A |
| Example 3 | A | A |
| Example 4 | A | A |
| Example 5 | A | A |
| Example 6 | A | A |
| Example 7 | A | A |
| Comp.Example 1 | A | A |
| Comp.Example 2 | B | B |
| Comp.Example 3 | B | B |

\*\* The letter A in Table 2 means no peeling, whereas the letter B means peeling of the tape occurring in at least one square space.

(Feel)

48 hours after the test piece was dried, the feel was evaluated based on the S value.

The values were obtained according to the measuring apparatus and correlation formula described in Society of Automotive Engineers of Japan, Inc., Proceedings, No.87–99, p.p.19–22 (1999).

Standard Values

Moist-dry feel: 0.10 or more

Soft-hard feel: 0.40 or more

Smooth-rough feel: 0.00 or more

Warm-cool feel: 0.00 or more

Soft value; 0.50 or more

Evaluation Criteria

A: All standards fulfilled

B: Not all standards fulfilled

The standard values were determined to establish an area of excellent feel based on the S value distribution made by evaluating the coating films of conventional lacquer coating composition, coating films of 2-package urethane coating (which are considered soft), and natural leather which provides remarkable feel.

The results are shown in Table 3.

TABLE 3

|  | Moist-dry feel | Soft-hard feel | Smooth-rough feel | Warm-cool feel | Soft value | Evaluation |
|---|---|---|---|---|---|---|
| Example 2 | 0.12 | 0.42 | 0.01 | 0.01 | 0.55 | A |
| Example 3 | 0.12 | 0.42 | 0.01 | 0.01 | 0.55 | A |
| Example 4 | 0.13 | 0.44 | 0.01 | 0.01 | 0.59 | A |
| Example 5 | 0.14 | 0.50 | 0.02 | 0.01 | 0.67 | A |
| Example 6 | 0.11 | 0.59 | 0.00 | 0.01 | 0.71 | A |
| Example 7 | 0.14 | 0.46 | 0.00 | 0.00 | 0.60 | A |
| Comp. Example 1 | 0.01 | 0.42 | −0.01 | 0.00 | 0.42 | B |
| Comp. Example 2 | 0.05 | 0.42 | 0.01 | 0.00 | 0.48 | B |
| Comp. Example 3 | 0.10 | 0.30 | 0.01 | 0.01 | 0.42 | B |

(Resistance to Beef Tallow)

Beef tallow (reagent commonly used in a test for resistance to beef tallow, product of Kanto Chemical Co., Ltd.) was applied to the coating surface of the test piece in an amount of 2 g/100 cm². The coated test piece was left for one week to stand in an electric furnace without forced convection in the atmosphere at 80° C. In the test, a flannel piece (a kind of cloth) was placed on the test piece to maintain the vaporization amount of beef tallow at a constant level.

After a lapse of one week, the test piece was fully washed with water using a small amount of neutral detergent. Then, the test piece was subjected to a peel test with an adhesive tape (cellophane tape) and to a dry-cloth friction test by an abrasion tester.

The peel test was carried out by cross-cutting the surface of the test piece to be tested (X-cut) with a cutter knife, fixing the cellophane tape to the cut surface and peeling off the tape.

On the other hand, the dry-cloth friction test was conducted by reciprocating a rubbing piece (gauze superimposed 5-fold on each other) on the surface of the test piece under a load of 40.09 kPa at 200 strokes over a distance of 100 mm.

Evaluation Criteria

Peel:

A: No peeling

B: Peeled

Dry-cloth friction:

A: No exposure of the substrate

B: The substrate was exposed

The results are shown in Table 4.

TABLE 4

|  | Peel | Dry-cloth friction |
|---|---|---|
| Example 2 | A | A |
| Example 3 | A | A |
| Example 4 | A | A |
| Example 5 | A | A |
| Example 6 | A | A |
| Example 7 | A | A |
| Comp.Example 1 | A | A |
| Comp.Example 2 | B | B |
| Comp.Example 3 | B | B |

The resistance to beef tallow is an index of the resistance to contamination with fats and oils. If the peel in Table 4 is rated A, this means that the coating film has such high adhesion to the substrate that natural fats and oils can not deteriorate the adhesion of the film. On the other hand, if the dry-cloth friction is rated A, this means that the coating film will not swell due to natural fats and oils, and has good barrier properties.

(Recoat Adhesion)

The test piece prepared in I-ii) was tested for recoat adhesion and evaluated by the following method.

The coating film was dried under the drying conditions described above in I-ii). Then the same coating composition was re-applied to the coating film after drying, more specifically, immediately after drying, and after standing for 1 day, for three days, for one week and for 10 days for confirmation of change with time. Then, the recoat adhesion of the test piece was evaluated by a cross-cut adhesion test.

The results are shown in Table 5.

TABLE 5

|  | Recoat adhesion |
|---|---|
| Example 2 | A |
| Example 3 | A |
| Example 4 | A |
| Example 5 | A |
| Example 6 | A |
| Example 7 | A |
| Comparative Example 1 | A |
| Comparative Example 2 | B |
| Comparative Example 3 | B |

The letter A in Table 5 means that there was no peel between the coating film and the recoating film immediately after drying and with time and that the recoat adhesion is satisfactory, whereas the letter B means peeling occurred between the coating film and the recoating film immediately after drying and with time.

Example 8

Preparation of Fine Particles of Lanolin-deposited Polyurethane Resin

A 60 g quantity of polyester polyol [Desmon No. 2200 (trade name), product of Nippon Polyurethane Industry Co., Ltd.] and 10 g of a lanolin derivative [polyoxyethylene (20) lanolin alcohol, Bellpol A-20 (trade name), product of Nissei Sangyo Co., Ltd.] were poured into xylene (poor solvent, 445 g) together with 7.0 g of N,N-dicyclohexylcarbodiimide (cyanamide) (adhesive reagent). Then 9.0 g of coconut oil-modified alkyd resin (oil length 33 and 0.56 g of zinc naphthenate (both being dispersing agents) were added and the mixture was heated to 90° C. with stirring.

Subsequently 32.5 g of hexamethylene diisocyanate [Coronate HL (trade name), product of Nippon Polyurethane Industry Co., Ltd.] and 55.3 mg of dibutyltin dilaurate (reaction catalyst) were added and the mixture was subjected to suspension polymerization under non-homogeneous conditions at 90° C. for 90 minutes.

After a lapse of 1 hour, 20 g of propylene glycol monomethyl ether was added as a reaction stopper. The mixture was stirred for about 10 minutes. The stirring gave 650 g of a suspension containing 260 g of fine particles of lanolin-deposited polyurethane resin wherein lanolin was deposited, to a thickness of about 3 μm, on the surface of spherical polyurethane resin fine particles having an average particle size of about 30 μm, the polyurethane resin having a hydroxyl value of 150 mgKOH/g resin. The average particle size of the lanolin-deposited polyurethane resin particles were measured with a laser diffraction particle size distribution measuring device (LA500, product of Horiba, Ltd.).

After filtering the suspension, dried fine particles of lanolin-deposited polyurethane resin were washed with xylene and toluene, but the lanolin derivative was not removed from the particles.

Reference Example 2

A suspension (solid concentration 40% by weight) containing 260 g of polyurethane resin fine particles was prepared in the same manner as in Example 1 with the exception of not adding the lanolin derivative.

Examples 9 to 15

II-i) Preparation of Coating Composition

Coating compositions comprising the following components a) to g) were prepared.

a) Binder Resin

Straight-chain polyester resin having a glass transition point of −40° C., a number average molecular weight of 3,000, a hydroxyl value of 40 mgKOH/g resin and an elastic coefficient of 30 MPa.

b) Polyisocyanate Containing at Least 2 Isocyanate Groups (Curing Agent)

Polymer of hexamethylene diisocyanate [Duranate E-402-90-T (trade name), product of Asahi Kasei Co., Ltd.]

c) Fine Particles of Lanolin-deposited Polyurethane Resin Prepared in Example 8 (the Lanolin-deposited Polyurethane Resin Fine Particles in the Form of a Suspension Were Used as Such.)

d) Reaction Accelerator

Dibutyltin dilaurate.

e) Reaction Retarder

Butyl acetoacetate f) Organic Solvent

Xylene g) Pine Particles of Silica (The fine particles of silica are generally used as a matting agent for a coating composition. The silica particles were used in such an amount as to make up for the matte remaining insufficient even after addition of fine particles of lanolin-deposited polyurethane resin and as to render the coating films uniform in gloss.)

The coating compositions of Examples 9 to 15 were prepared by mixing 40 parts by weight of xylene with the binder resin and the matting agent in the amounts indicated in the formulation shown in Table 6 with stirring and dispersing the mixture in the suspension obtained in Example 8 to provide a coating composition having a solids content of 25% by weight. The curing agent, the reaction accelerator and the reaction retarder were added to the composition immediately before application of the coating composition.

TABLE 6

|  | a) Polyester resin | b) Polyisocyanate resin | c) Lanolin-deposited polyurethane particles of Ex.8 | d) Reaction accelerator | e) Reaction retarder | g) Silica fine particles |
|---|---|---|---|---|---|---|
| Example 9 | 70 | 30 | 5 | 0.5% | 10% | 17 |
| Example 10 | 70 | 30 | 5 | 2.0% | 15% | 17 |
| Example 11 | 60 | 40 | 5 | 0.3% | 5% | 14 |
| Example 12 | 60 | 40 | 12 | 0.5% | 10% | 14 |
| Example 13 | 60 | 40 | 12 | 0.8% | 12% | 14 |
| Example 14 | 45 | 55 | 22 | 0.5% | 10% | 10 |
| Example 15 | 45 | 55 | 22 | 0.8% | 12% | 10 |

*** The amounts of components a), b), c) and g) are expressed in part(s) by weight calculated as the solids.
**** The amounts of components d) and e) are expressed in proportions (% by weight) based on the total amount of solids in the coating composition.

Pot Life of Coating Composition

The viscosity of the coating composition immediately after adding specified amounts of components (a) to (g) was measured. Then the opening of the container containing the composition was closed to prevent vaporization of the solvent. The composition was left to stand in the atmosphere of 20° C., while the viscosity was measured with time. The results are shown in Table 7.

TABLE 7

|  | Immediately after preparation | After 1 hour | After 2 hours |
|---|---|---|---|
| Example 9 | 13.3 | 13.7 | 14.6 |
| Example 10 | 13.1 | 13.9 | 15.0 |
| Example 11 | 13.2 | 13.9 | 15.1 |
| Example 12 | 12.9 | 13.8 | 14.9 |
| Example 13 | 13.0 | 13.1 | 14.8 |
| Example 14 | 13.2 | 13.9 | 15.0 |
| Example 15 | 13.1 | 13.8 | 14.9 |

The viscosity was measured by Ford cup No.4. The values of viscosity in Table 7 are in terms of second(s)/Ford cup No.4/20° C.

The coating compositions of Examples 9 to 15 had a pot life of 2 hours or longer (time period until the increase of viscosity immediately after preparation of coating composition is 2 seconds).

The coating compositions of Examples 9 to 15 retained the liquid form for 4 hours due 'to incorporation of specified amounts of the reaction accelerator and the reaction retarder. Thus, the compositions were made applicable by dilution or other methods.

II-ii) Preparation for Test Piece

A test piece was produced by applying each coating composition of Examples 9 to 15 to a substrate of acrylonitrile-styrene-butadiene copolymer and drying the coated substrate at 70° C. for 5 minutes to form a coating film having a thickness of about 30 to about 40 μm (after drying).

II-iii) Property Evaluation of Coating Film (Adhesion)

The test piece produced in II-ii) was left to stand at room temperature for 48 hours and was subjected to a cross-cut adhesion test to evaluate the adhesion of coating film.

Further the test piece was left to stand in a humidistat box (50° C., 95% RH or higher) for 240 hours and was subjected to a cross-cut adhesion test to evaluate the adhesion of coating film. Specifically, 100 squares (2 mm×2 mm) were formed on the surface of each coating film, and an adhesive tape was adhered to the surface and the peeled off. The results are shown in Table 8.

TABLE 8

|  | After 48 hours | After 240 hours (in humidistat) |
|---|---|---|
| Example 9 | A | A |
| Example 10 | A | A |
| Example 11 | A | A |
| Example 12 | A | A |
| Example 13 | A | A |
| Example 14 | A | A |
| Example 15 | A | A |

***** The letter A in Table 8 means no peeling, whereas the letter B means peeling of the tape occurring in at least one square space.

(Feel)

48 hours after the test piece was dried, the feel was evaluated based on the S value.

The values were obtained according to the measuring apparatus and correlation formula described in Society of Automotive Engineers of Japan, Inc., Proceedings, No.87–99, p.p.19–22 (1999).

Standard Values

Moist-dry feel: 0.10 or more

Soft-hard feel: 0.40 or more

Smooth-rough feel: 0.00 or more

Warm-cool feel: 0.00 or more

Soft value; 0.50 or more

Evaluation Criteria

A: All standards fulfilled

The standard values were determined to establish an area of excellent feel based on the S value distribution made by evaluating the coating films of conventional lacquer coating composition, coating films of 2-package urethane coating (the feel of coating film was considered soft), and natural leather which provides remarkable feel.

The results are shown in Table 9.

TABLE 9

|  | Moist-dry feel | Soft-hard feel | Smooth-rough feel | Warm-cool feel | Soft value | Evaluation |
|---|---|---|---|---|---|---|
| Ex. 9 | 0.12 | 0.42 | 0.01 | 0.01 | 0.55 | A |
| Ex. 10 | 0.12 | 0.42 | 0.01 | 0.01 | 0.55 | A |
| Ex. 11 | 0.14 | 0.50 | 0.01 | 0.01 | 0.66 | A |
| Ex. 12 | 0.14 | 0.50 | 0.01 | 0.01 | 0.67 | A |
| Ex. 13 | 0.11 | 0.59 | 0.00 | 0.01 | 0.71 | A |
| Ex. 14 | 0.14 | 0.46 | 0.00 | 0.00 | 0.60 | A |
| Ex. 15 | 0.13 | 0.44 | 0.02 | 0.00 | 0.59 | A |

(Resistance to Beef Tallow)

Beef tallow (reagent commonly used in a test for resistance to beef tallow, product of Kanto Chemical Co., Ltd.) was applied to the surface of the test piece in an amount of 2 g 100 cm². The coated test piece was left for one week to stand in an electric furnace without forced convection in the atmosphere at 80° C. In the test, a flannel piece (a kind of cloth) was placed on the test piece to maintain the vaporization amount of beef tallow at a constant level.

After a lapse of one week, the test piece was fully washed with water using a small amount of neutral detergent. Then, the test piece was subjected to a peel test with an adhesive tape (cellophane tape) and to a dry-cloth friction test by an abrasion tester.

The peel test was carried out by cross-cutting the surface of the test piece to be tested (X-cut) with a cutter knife, fixing the cellophane tape to the cut surface and peeling off the tape.

On the other hand, the dry-cloth friction test was conducted by reciprocating a rubbing piece (gauze superimposed 5-fold on each other) on the surface of the test piece under a load of 40.09 kPa at 200 strokes over a distance of 100 mm.

Evaluation Criteria

Peel:

A: No peeling

B: Peeled

Dry-cloth friction:

A: No exposure to the substrate

B: Exposed to the substrate

The results are shown in Table 10.

TABLE 10

|  | Peel | Dry-cloth friction |
|---|---|---|
| Example 9 | A | A |
| Example 10 | A | A |
| Example 11 | A | A |
| Example 12 | A | A |
| Example 13 | A | A |
| Example 14 | A | A |
| Example 15 | A | A |

The resistance to beef tallow is an index of the resistance to contamination with fats and oils. If the peel in Table 10 is rated A, this means that the coating film has such high adhesion to the substrate that natural fats and oils can not deteriorate the adhesion of the film. On the other hand, if the dry-cloth friction is rated A, this means that the coating film will not swell due to natural fats and oils, and had good barrier properties.

(Recoat Adhesion)

The recoat adhesion of the test piece prepared II-ii) was evaluated by the following method.

The coating film was dried under the drying conditions described in II-ii). Then the same coating composition was re-applied to the coating film after drying, more specifically, immediately after drying, and after standing for 1 day, for three days, for one week and for 10 days for confirmation of change with time. Then, the recoat adhesion of the test piece was evaluated by a cross-cut adhesion test.

The results are shown in Table 11.

TABLE 11

|  | Recoat adhesion |
|---|---|
| Example 9 | A |
| Example 10 | A |
| Example 11 | A |
| Example 12 | A |
| Example 13 | A |
| Example 14 | A |
| Example 15 | A |

The letter A in Table 11 means that there was no peel between the coating film and the recoating film immediately after drying and with time and that the recoat adhesion is satisfactory, whereas the letter B means peeling occurred between the coating film and the recoating film immediately after drying and with time.

EFFECT OF THE INVENTION

The coating compositions of the invention attained the standard values in any of moist-dry feel, soft-hard feel, smooth-rough feel and warm-cool feel and exhibited a high s value, namely are excellent in feel and are also superior in adhesion and recoat adhesion and in resistance to contamination with fats and oils.

The coating compositions of the invention containing specified amounts of a reaction accelerator and a reaction retarder are remarkable in low-temperature curability and have an extended pot life and therefore are advantageous in terms of energy and line costs and significantly suitable for commercial use.

What is claimed is:

1. Fine particles of lanolin-deposited polyurethane resin comprising a lanolin derivative and fine particles of polyurethane resin, the lanolin derivative being not removed even when the fine particles of lanolin-deposited polyurethane resin are washed with a good solvent for the lanolin derivative.

2. The fine particles of lanolin-deposited polyurethane resin as defined in claim 1 which have an average particle size of 5 to 40 μm.

3. The fine particles of lanolin-deposited polyurethane resin as defined in claim 1 which are obtainable by reacting at least one member selected from the group consisting of polyester resins and polyether resins with a polyisocyanate having at least two isocyanate groups in a poor solvent in the presence of the lanolin derivative.

4. The fine particles of lanolin-deposited polyurethane resin as defined in claim 3, wherein the amount of deposited lanolin is such that the average particle size is increased by 1 to 5 μm when reacting said at least one member selected from the group consisting of polyester resins and polyether resins with the polyisocyanate having at least two isocyanate groups in a poor solvent in the presence of the lanolin derivative, compared with the average particle size of fine particles obtained by reacting said at least one member selected from the group consisting of polyester resins and polyether resins with the polyisocyanate having at least two isocyanate groups in a poor solvent in the absence of the lanolin derivative.

5. A process for preparing the fine particles of lanolin-deposited polyurethane resin as defined in claim 1, the process comprising reacting at least one member selected from the group consisting of polyester resins and polyether resins with a polyisocyanate having at least two isocyanate groups in a poor solvent in the presence of a lanolin derivative.

6. A coating composition comprising:

(i) at least one binder resin selected from the group consisting of polyester resins and polyether resins, the binder resin having a glass transition temperature of −30 to −70° C., a number average molecular weight of 1,000 to 50,000 and a hydroxyl value of 30 to 70 mgKOH/g resin, (ii) a polyisocyanate having at least two isocyanate groups, (iii) the fine particles of lanolin-deposited polyurethane resin as defined in claim 1, and (iv) an organic solvent.

7. The coating composition as defined in claim 6 which contains 5 to 20 parts by weight of the fine particles of lanolin-deposited polyurethane resin per 100 parts by weight of the total weight of the binder resin and the polyisocyanate having at least two isocyanate groups.

8. The coating composition as defined in claim 6 which further contains (v) a reaction accelerator and (vi) a reaction retarder, wherein the amount of the reaction accelerator is 0.2 to 2 by weight based on the total weight of solids in the composition and the amount of the reaction retarder is 5 to 15% by weight based on the total weight of solids in the composition.

9. The coating composition as defined in claim 8, wherein the binder resin has a glass transition temperature of −30 to −70° C., a number average molecular weight of 1,000 to 25,000 and a hydroxyl value of 50 to 70 mgKOH/g resin and is at least one member selected from the group consisting of polyester resins and polyether resins, wherein the fine particles of lanolin-deposited polyurethane resin comprise a lanolin derivative and fine particles of polyurethane resin, in which the lanolin derivative can not be removed even when the fine particles of lanolin-deposited polyurethane resin are washed with a good solvent for the lanolin derivative, wherein the fine particles of the lanolin-deposited polyurethane resin have an average particle size of 5 to 40 μm, and a hydroxyl value of 50 to 200 mgKOH/g resin, and wherein the proportions of the binder resin and the polyisocyanate (by weight ratio) ranges from 80:20 to 40:60.

10. The coating composition as defined in claim 8, wherein the ratio (weight ratio) of the reaction accelerator (x) and the reaction retarder (y) is x:y=1:20 to 1:7.5.

11. The coating composition as defined in claim 8, wherein the reaction accelerator is a tin catalyst.

12. A coated article prepared by applying the coating composition of claim 6 to a substrate to be coated.

* * * * *

UNITED STATES PATENT AND TRADEMARK OFFICE
CERTIFICATE OF CORRECTION

PATENT NO.    : 6,835,772 B2                                    Page 1 of 1
DATED         : December 28, 2004
INVENTOR(S)   : Kita et al.

It is certified that error appears in the above-identified patent and that said Letters Patent is hereby corrected as shown below:

<u>Title page,</u>
Item [75], Inventor, change "Takashi Kita, Okayam-ken" to be -- Takashi Kita, Okayama-ken -- and change "Kenji Kawazu, Nagoya (JP)" to be -- Kenji Kawazu, Toyota (JP) --

Signed and Sealed this

Tenth Day of May, 2005

JON W. DUDAS
*Director of the United States Patent and Trademark Office*